United States Patent [19]

Swartz et al.

[11] Patent Number: 5,767,496

[45] Date of Patent: Jun. 16, 1998

[54] APPARATUS FOR PROCESSING SYMBOL-ENCODED CREDIT CARD INFORMATION

[75] Inventors: Jerome Swartz, Oakfield; Eugene Joseph, Coram; Joseph Katz, Stoney Brook, all of N.Y.

[73] Assignee: Symbol Technologies, Inc., Holtsville, N.Y.

[21] Appl. No.: 439,926

[22] Filed: May 12, 1995

Related U.S. Application Data

[62] Division of Ser. No. 187,290, Jan. 27, 1994.

[51] Int. Cl.$^6$ ........................................... G06K 7/10
[52] U.S. Cl. ........................................... 235/462; 364/419
[58] Field of Search ........................... 235/380, 381, 235/462, 379; 382/115, 116, 119; 902/3; 364/419

[56] References Cited

U.S. PATENT DOCUMENTS

| | | | |
|---|---|---|---|
| 4,344,135 | 8/1982 | Crane et al. | 364/419 |
| 4,752,965 | 6/1988 | Dunkley et al. | 235/330 |
| 5,138,140 | 8/1992 | Siemiatkowski et al. | 332/119 X |
| 5,150,420 | 9/1992 | Haraguchi | 235/380 |
| 5,337,358 | 8/1994 | Axelrod et al. | 235/380 X |
| 5,455,406 | 10/1995 | Terashima et al. | 902/3 X |

FOREIGN PATENT DOCUMENTS

| | | | |
|---|---|---|---|
| 8195280 | 11/1983 | Japan | 382/116 |
| 1217879 | 9/1986 | Japan | 382/115 |
| 0224888 | 9/1989 | Japan | 902/3 |

*Primary Examiner*—Donald T. Hajec
*Assistant Examiner*—Thien Minh Le

[57] ABSTRACT

Document information is encoded in a graphic symbol applied to the document. The symbol is read to retrieve the document information which is then translated into a humanly discernible form different from that appearing on the document. In particular, encoded symbols are used to uniquely identify or memorialize persons named on credit cards.

2 Claims, 2 Drawing Sheets

APPARATUS FOR PROCESSING SYMBOL-ENCODED CREDIT CARD INFORMATION

This is a divisional of application Ser. No. 08/187,290 filed on Jan. 27, 1994, now pending.

REFERENCE TO RELATED APPLICATIONS

This application is related to the application of Ynjiun R. Wang, et al., application Ser. No. 07/461,881, filed Jan. 5, 1990, and entitled "Non-Volatile Electro-Optical Read-Only Memory in High Density Dimensional Symbology", now U.S. Pat. No. 5,304,786; to the application of Li, et al., Ser. No. 08/123,955, filed Sep. 20, 1993, and entitled "Apparatus for Processing Human-Readable and Machine-Readable Documents"; and Ynjiun P. Wang et al. application Ser. No. 07/891,742, filed Jun. 1, 1992 and entitled "Record with Encoded Data", now U.S. Pat. No. 5,337,361. The disclosures of these related applications are incorporated herein by reference.

BACKGROUND OF THE INVENTION

1. Field of the Invention

The present invention relates to the use of machine-readable symbols with high information density and capacity for recording document information, and more particularly to the reproduction of such document information in a unique form.

2. Description of the Prior Art

Encoded symbols, such as the well-known UPC bar code symbol, have gained wide use in many industries as a tool to increase speed and accuracy of data capture in a vast number of diverse applications, such as point-of-sale item pricing, inventory control, article tracking, and so on.

The traditional bar code symbols are quite limited, however, in the amount of encoded data or information they can contain. Thus, in many applications, the bar code symbol borne by an item is simply an address to a database where information regarding the item is stored, such as a plain language descriptor of the item, price, etc.

The above-cited, related U.S. Pat. No. 5,304,786 discloses a two dimensional bar code symbol which has high information density and capacity capabilities. This symbol, known as the PDF417 bar code symbol, can serve as a portable data file containing all the information necessary to identify and describe the item to which it is applied. In fact, the PDF417 symbol has sufficient information density and capacity to represent as many as 500 characters per square inch of ASCII data. Thus, a relatively small number of PDF417 symbols, and in some cases a single PDF417 symbol can be encoded with alphanumeric text filling a letter-size document, as disclosed in the above-cited, related application Ser. No. 08/123,955.

SUMMARY OF THE INVENTION

The present invention is directed to apparatuses and methods for processing machine-readable symbols applied to a variety of human-readable documents and encoded with information pertaining to the documents. The document symbol is optically scanned and decoded to symbol data, and the symbol data is then translated into a humanly discernible form different from the information format appearing on the document.

In accordance with one embodiment of the invention, a symbol is applied to a credit card and encoded with image data representing the signature of the authorized card holder. The symbol is then scanned, decoded to symbol data, and translated to image data which is used to generate a display of the authorized card holder's signature. The displayed signature is then compared with the signature executed by a person presenting the card for a credit purchase to verify that the person presenting the card is the authorized card holder.

Alternatively, the symbol may be encoded with biometric data, such as pen pressure, stroke velocity and direction, etc., extracted during signature execution by the authorized card holder. Then, at the time of a credit purchase, the symbol-encoded biometric data is compared with corresponding biometric data extracted during signature execution by the card presenter to verify that the authorized card holder and the card presenter are the same person.

Additional features and advantages of the present invention will be set forth in the description which follows and in part will be apparent from the description, or may be learned by practice of the invention. The objectives and other advantages of the invention will be realized and obtained by the apparatuses particularly pointed out in the detailed description and appended claims, as well as in the accompanying drawings.

It is to be understood that both the foregoing general description and the following detailed description are intended to provide further explanation of the invention as claimed.

The accompanying drawings are included to provide further understanding of the invention and are incorporated in and constitute a part of the specification, illustrate several embodiments of the invention and together with the specification serve to explain the principles of the invention.

DETAILED DESCRIPTION OF PREFERRED EMBODIMENTS

Introduction

Figure 1:
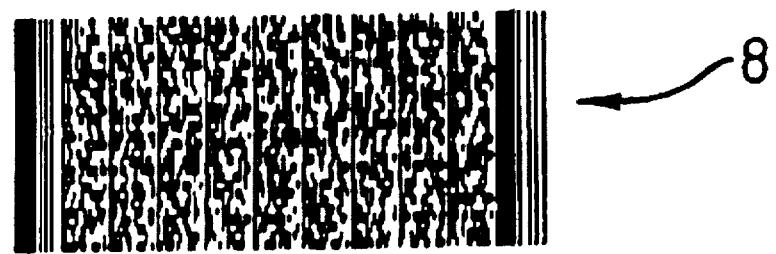
FIG. 1 is an illustration of an exemplary two-dimensional bar code symbol having utility in the present invention.

The various embodiments of the present invention are predicated on the use of a high information density and capacity bar code symbol, such as, for example, the two-dimensional bar code symbol disclosed in the cited U.S. Pat. No. 5,304,786. An example of this symbol, known as the PDF417 symbol, is illustrated at 8 in FIG. 1. According to the present invention, symbols 8 are applied to documents and encoded with various kinds of data representing document information. The document information, when retrieved from the symbols, is translated to a desired format for presentation in a humanly intelligible form different from the form contained by the document. It should be noted that throughout this application, wherever a PDF417 symbol is used, a single symbol may be replaced by multiple symbols when capacity requirements for a particular application exceed that of a single symbol.

Symbol-Encoded Signature Information

Figure 2:
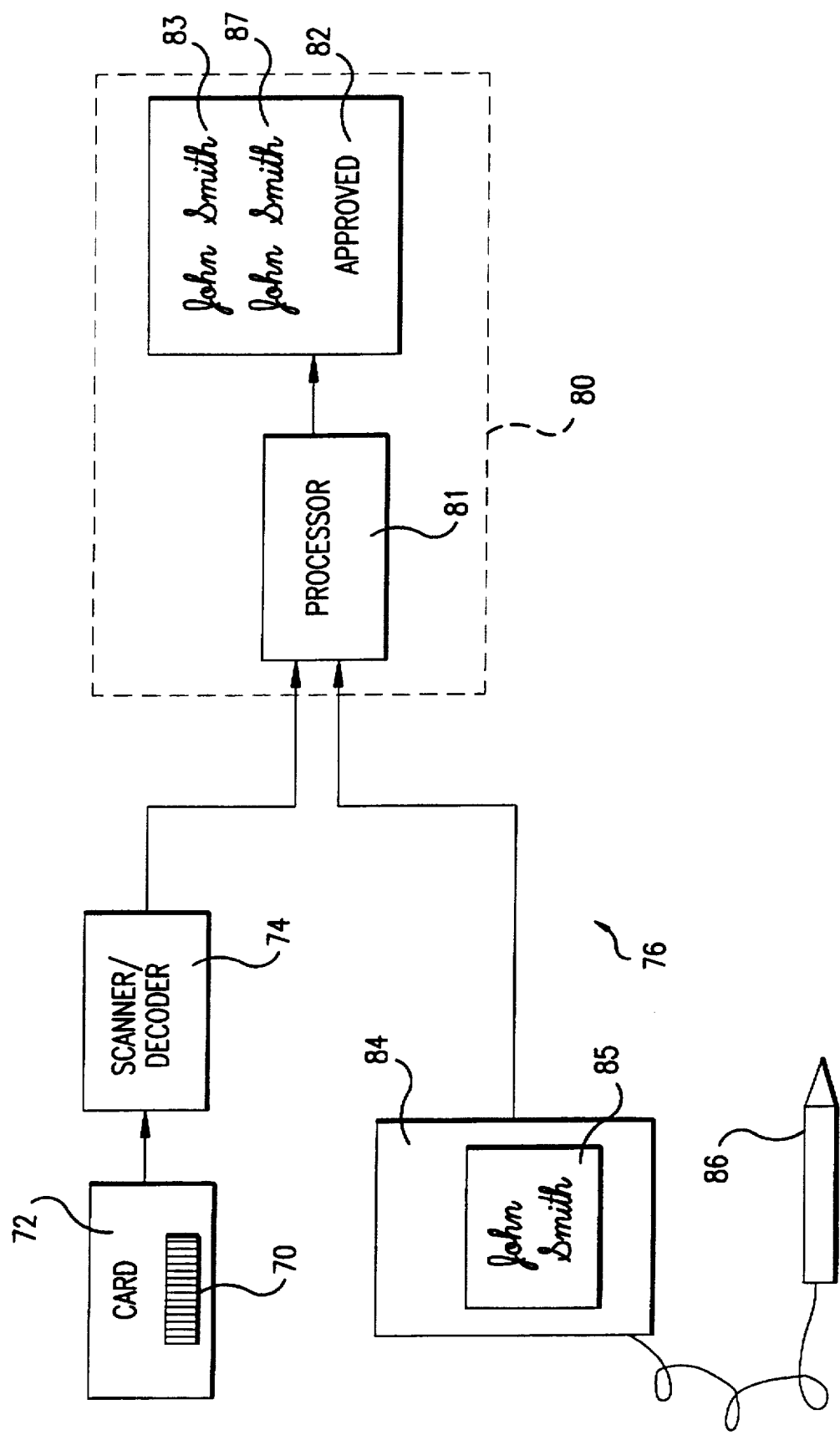
FIG. 2 is a block diagram illustrating apparatus constructed in accordance with another embodiment of the present invention.

In the embodiment of the invention seen in FIG. 2, a symbol, such as a PDF417 bar two-dimensional code symbol, is encoded with signature information. This signature information is encoded in the symbol in a suitable format, such as a bit-mapped representation of a signature. The signature-encoded symbol 70 is printed on or otherwise affixed to a credit card 72 or other instrument or document.

Although the credit card bears the printed name of the authorized card holder, the card holder's signature will not appear on the card.

When a customer desires to make a purchase using credit card 72, the credit card is presented to a sales person. The signature-encoded symbol 70 on credit card 72 is then scanned and decoded to symbol data by a scanner/decoder 74 included in signature capture and verification apparatus 76 of FIG. 2. Scanner/decoder 74 may be constructed in the manner taught in 5,243,655, entitled "System for Encoding and Decoding Data in Machine Readable Graphic Form".

The symbol data is fed to a computer 80 which includes a processor 81 and a display screen 82. Processor 81 converts the symbol data into a bit-mapped representation of the signature the authorized holder of credit card 72 using a suitable conversion algorithm. The bit-mapped signature data is then displayed on screen 82 as an image 83 of the authorized cardholder's signature.

Apparatus 76 also includes a pen-based computer 84 which includes a scratch pad 85 and an electronic pen 86. In practice, computer 80 and pen-based computer 84 may comprise a single computer system. For example, the functions of computers 80 and 84 may be implemented using a Portable Data Terminal (PDT) 3300, produced by Symbol Technologies, Inc., assignee of this application, combined with an Advanced Function Technology (AFT) pen based subsystem, produced by Calcomp, of Scotsdale, Ariz.

The customer executes his or her signature 87 on scratch pad 85 using electronic pen 86. The pen-based computer 84 captures the signature in a suitable data format. The captured signature is transmitted to computer 80 and displayed on screen 82, as indicated at 87, in juxtaposition with the displayed signature 83 of the authorized card holder derived from symbol 70. The sales person can then visually compare the two signatures to determine the authenticity of the customer's signature. If the two signatures do not appear substantially alike, credit card 72 is not accepted. In this embodiment, the authorized card holder's signature would not appear on credit card 72, so a person attempting to use a lost or stolen credit card would be unable to determine the authorized card holder's signature, making forgery more difficult.

Alternatively, computer can be programmed, using a signature recognition algorithm to electronically compare the authorized card holder's signature and the customer's signature. The results of this electronic comparison will then be displayed on screen 82, such as by displaying the word "Approved" if the two signatures favorably compare or the word "Disapproved" if the two signatures do not.

If approval is based on a visual comparison of the authorized card holder's signature and the customer's signature by a sales person, pen-based computer 84 may be eliminated.

Rather than encoding symbol 70 with image data of the authorized card holder's signature, the symbol may be encoded with biometric data uniquely identifying the authorized card holder's signature. This biometric data may include pen pressure, stroke velocity and direction, and duration. Corresponding biometric data is then extracted from the customer's signature when executed on the scratch pad of pen-based computer 84 using electronic pen 86. Computer 80 then electronically compares the biometric data of the authorized card holder's signature encoded in symbol 70 with the biometric data extracted from the customer's signature to determine whether the pending credit card purchase should be approved or disapproved.

Alternatively, rather than encoding symbol 70 with signature data, the symbol may be encoded with other biometric data, such as pictorial data, retinal eye pattern data, fingerprint data, handprint data, etc., that uniquely identifies the authorized card holder. These alternatives would require other forms of hardware to capture identity data, such as a video camera, retinal scanner, fingerprint or handprint scanner, etc. If the symbol is encoded with pictorial data of the authorized card holder's face, the symbol 70 would be scanned and decoded to symbol data. The symbol data would then be converted to image data to display a likeness of the authorized card holder on screen 82. The sales person can then determine if the displayed image is a reasonable likeness of the customer.

Alternatively, the authorized card holder's pictorial image derived from symbol 70 may be electronically compared with a pictorial image of the customer taken by a video camera. If the identification data encoded in symbol 70 is a retinal eye pattern, fingerprint or handprint data, such identifying data would be obtained from the customer using an appropriate scanner. The computer would then electronically compare the identifying data derived from the symbol with the identifying data obtained from the customer to determine whether the credit card purchase should be approved or disapproved.

While the embodiment of the invention illustrated in FIG. 2 has been disclosed in its application to approving credit card sales transactions, it will be appreciated that the apparatus has other applications where it is important to verify that the carrier of a card is in fact the authorized holder of the card. For example, card 72 may be an identification badge used to control access to security sensitive areas.

It will be apparent to those skilled in the art that various modifications and variations can be made in the method and apparatus of the present invention without departing from the spirit or scope of the invention. Thus, it is intended that the present invention cover modifications and variations of the invention disclosed herein, provided they come within the scope of the appended claims and their equivalents.

We claim:

1. A system for verifying the authenticity of a manual signature presented by a bearer of an identification card, wherein said identification card comprises a two-dimensional bar code symbol encoded with a bit-mapped representation of an authorized signature, said system comprising:

bar code reading means for optically scanning said two-dimensional bar code symbol and for decoding said scanned symbol to produce a first digital data signal representative of said authorized signature;

computer input means accessible to said identification card bearer, said computer input means comprising electronic pen data entry means for allowing said identification card bearer to provide a manual bearer signature at the time said identification card is presented and for providing a second digital data signal representative of said manual bearer signature;

a display for displaying said authorized signature from said first digital data signal and for displaying said manual bearer signature from said second digital data signal; and a comparator for comparing said first digital data signal with said second digital data signal and for providing an indication when said signals are equivalent to each other.

2. The system of claim 1 wherein said two-dimensional bar code symbol is encoded with the PDF417 symbology.

* * * * *